Patented Oct. 6, 1942

2,297,733

UNITED STATES PATENT OFFICE 2,297,733

MANUFACTURE OF TRINITROTOLUENE OF HIGH PURITY

Joseph A. Wyler and Richard N. Boyd, Allentown, Pa., assignors to Trojan Powder Company, Allentown, Pa.

No Drawing. Application December 26, 1940, Serial No. 371,823

1 Claim. (Cl. 260—645)

Our invention relates to a process for the nitration of toluene to trinitrotoluene and is more particularly concerned with the tri-nitration step and subsequent purification of the product formed in this step.

Many commercial processes are known for the nitration of toluene to trinitrotoluene, all of which are based upon the use of mixtures of nitric and sulfuric acids. The chief points of difference between these various processes lie in the compositions of the mixed acids, the temperatures of the nitrations, the orders of addition of the reactants, the methods of separation of the trinitrotoluene from the spent acids, the methods of further purification of the trinitrotoluene, etc. Consequently, the products resulting from these processes vary considerably from the standpoint of general purity and, what is now of particular importance, from the standpoint of the physical condition and distribution of the impurities present in the trinitrotoluene.

The main object of our invention is to produce a trinitrotoluene of solidification point greater than 80.2° C. (U. S. Government specification requirement) without the use of an organic solvent. Another object is to produce a product which has a melting point of 77° C. or higher at the end of the tri-nitration step itself and before this product has been subjected to any further purification procedure. A still further object is to produce a trinitrotoluene containing its impurities (dinitroluene and asymmetric trinitrotoluenes) in a certain physical relationship to one another, that is, the asymmetric trinitrotoluenes are not to be in solid solution in the sym-trinitrotoluene but are to be segregated on the surface of the sym-trinitrotoluene crystals; and the asymmetric trinitrotoluenes are not to be dissolved in the dinitrotoluene and thus rendered incapable of removal by subsequent sodium sulfite treatments. Still further objects will become apparent upon a further perusal of this specification.

Now, as mentioned above, the nitration of toluene to trinitrotoluene using $H_2SO_4$—$HNO_3$ mixed acids is well known. It is also well known that if the trinitrotoluene produced in accordance with these known processes is grained (crystallized with stirring) under water and if these crystals are treated with dilute solutions (2–8%) of $Na_2SO_3$ in water that the melting point of the trinitrotoluene is substantially increased due to the extraction of asymmetric trinitrotoluenes from the sym-trinitrotoluene. However, so far as we are aware no publicly known process exists in which this combination of steps (nitration, graining, and sulfiting) has ever directly yielded a trinitrotoluene of solidification point equal to or greater than 80.2° C. Evidence of the difficulty of arriving at such a result is to be found in the patent literature over the past few years in which patentees claim the use of hot solutions of sodium sulfite containing buffers as sodium borate, acetate, etc., for the purpose of dissolving the asymmetric trinitrotoluene without causing too much disintegration of the 2, 4, 6 trinitrotoluene. The purpose of the buffers is to prevent the disintegration which would be caused by the hot buffer-free sodium sulfite treatment and the reason these inventors use such a severe treating process is because the trinitrotoluene they start with does not have the proper physical properties and composition.

We have discovered that if the tri-nitration step for the preparation of trinitrotoluene is carried out in a certain manner and if the product thus made is given a special "graining" treatment to be disclosed below, that the ordinary well known sulfite treatment suffices to make a product of solidification point as high as 80.5° C.

We have also discovered that our special "graining" treatment used on a trinitrotoluene not made in accordance with our tri-nitration step produces an improved crystalline trinitrotoluene which upon being subjected to the well known sulfite process will have its solidification point raised as much as 4° C. as against only 1.8–2.2° C. for crystalline trinitrotoluene "grained" in accordance with the well known processes, although the combination of our special "graining" and the well known sulfite step will not bring the final solidification point of this improperly nitrated product to as high as 80.2° C. (Requirement for Grade A trinitrotoluene). To effect this latter result we find it necessary to combine this "graining" step with our "trinitration" step.

As examples of our invention we give the following:

Example 1

100 parts (by weight) of dinitrotoluene (made in accordance with any well known process) are placed in a suitable nitrator and treated with 400 parts of a mixed acid containing:

| | Percent |
|---|---|
| $SO_3$ | 39.00 |
| $H_2SO_4$ | 30.50 |
| $HNO_3$ | 30.50 | first at a temperature of 65–70° C. and then, after all acid has been added, at a temperature as high as about 110° C. The mixture is stirred in the hot for at least one hour after all of the acid has been added, and the charge is allowed to cool somewhat and to separate into two layers—the upper layer being essentially trinitrotoluene and the lower being spent acid containing the various trinitrotoluene isomers and various impurities. This separation of the trinitrotoluene in the molten condition is an essential part of our invention. The molten trinitrotoluene is allowed to flow into a suitable tank containing hot water and provided with a stirrer. It is then washed with successive portions of hot water until the trinitrotoluene contains less than about 0.1% free acid, calculated to percent $H_2SO_4$.

The spent acid may be fortified with nitric acid and used for the nitration of mononitrotoluene to dinitrotoluene or it may be diluted with water in order to precipitate out of it a relatively impure trinitrotoluene which may be used in certain commercial explosives.

We wish to emphasize that there is nothing new in using a mixed acid containing a high free —$SO_3$ and high $HNO_3$ content for the trinitration step and this, therefore, is not our invention. Our invention resides in the separation of the trinitrotoluene in the molten condition from a spent acid of a composition within the range:

|  | Percent |
|---|---|
| $H_2SO_4$ | 75–99 |
| $HNO_3$ | 1–25 |
| $H_2O$ | 10–0 |
| $SO_3$ | 0–15 |

The new result obtained by our nitration step is that we obtain a product (trinitrotoluene) which is not only of an unusually high setting point at the end of the nitration itself, but is characterized by containing an unusually low proportion of the asymmetric trinitrotoluenes. Our separation of the trinitrotoluene, as a molten layer, from the spent acid of the limited composition indicated, enables the spent acid to function in a different manner than in any of the known commercial processes where the spent acid is either cooled below the melting point of the trinitrotoluene before the trinitrotoluene is separated or where the spent acid contains too much water or too little sulfuric acid to function in the proper manner, that is, to extract the asymmetric trinitrotoluenes from the sym-trinitrotoluenes and to hold these asymmetric trinitrotoluenes in solution.

*Example 2*

11.7 parts of a crude dinitrotoluene (setting point 36.50° C.) where placed in a suitable nitrator pot and heated to 65–70° C. Then 23.2 lbs. of an oleum consisting of:

|  | Per cent |
|---|---|
| Total $SO_3$ calculated to $H_2SO_4$ | 95.00 |
| $HNO_3$ | 8.70 |
|  | 103.70 | were added to this mixture, keeping the temperature at about 70° C. Then 7.8 lbs. of a mixed acid of the following composition:

|  | Per cent |
|---|---|
| $H_2SO_4$ | 19.69 |
| $HNO_3$ | 78.68 |
| $N_2O_3$ | 0.27 |
| $H_2O$ | 1.36 |
|  | 100.00 | were added at 80–85° C. and the temperature allowed to rise to 95° C. during the next half hour. The mixture was stirred at this temperature for one hour when the temperature was slowly raised to 100–104° C. and the mixture stirred at this temperature for 2 hours additional. The mixture was then allowed to settle, with cooling, to about 80° C. and the molten trinitrotoluene separated by decantation from the lower layer of spent acid. The trinitrotoluene was then given the usual hot water washes, then our "emulsification-graining" step and finally the sodium sulfite treatment as described below. The solidification point of the trinitrotoluene as made in this tri-nitration step was 77.4° C. and this was raised to 80.38° C. by the succeeding steps. The composition of the spent acid formed in the tri-nitration step was:

|  | Per cent |
|---|---|
| $H_2SO_4$ | 79.02 |
| $HNO_3$ | 10.26 |
| $H_2O$ | 8.34 |
| $N_2O_3$ | 2.38 |
|  | 100.00 |

In another similar run a product of solidification point of 80.47° C. was obtained. The rise in solidification point produced by the $Na_2SO_3$ step being 2.7° C.

The trinitrotoluene as produced by our tri-nitration step will have a solidification point of 77.0° C. or better but is not of satisfactory purity to meet the requirements of Grade A, U. S. Government specifications, and consequently must be given further purification treatments.

It is well known that the trinitrotoluene as made by known processes, can be further purified by first "wet graining" the impure trinitrotoluene so as to obtain a crystalline product and then treating this product with sodium sulfite as mentioned above or by using a solvent such as alcohol, ethylene dichloride etc., or by a combination of the sodium sulfite and solvent treatments, but so far as we are aware, it has not been possible heretofore to produce a trinitrotoluene of satisfactory quality to meet the U. S. Government specifications for Grade A, trinitrotoluene, by simply subjecting the impure tri-nitrotoluene as it comes from the well known tri-nitration step to a "wet graining" step and then to a sodium sulfite treatment followed by washing and drying. A supplementary solvent treatment has always been necessary.

We have discovered that it is possible to produce the high grade trinitrotoluene mentioned above by giving the crude trinitrotoluene from the tri-nitration step an "emulsification" graining and then proceeding with the sulfite treatment in the well known manner without requiring the use of any organic solvent.

Our "emulsification" graining step is carried out as follows:

100 parts (by weight) of hot water (80° C. or higher) are placed in a suitable tank provided with an efficient, high-speed stirrer, and about 100 parts (by weight) of the molten, slightly acid trinitrotoluene (made as described above) added, with rapid stirring. The hot mixture is stirred until a complete suspension and "emulsification" takes place, and the contents of the tank assume a viscous, syrupy condition. This requires about 20 minutes. The mixture is then allowed to cool slowly in order to break the "emulsion." This usually takes place at 75–76° C.

forming a very finely crystalline product in which the impurities are segregated upon the surface of the crystals of trinitrotoluene. The contents of the tank may be run upon a filter, washed with water, and then given a sodium sulfite treatment as described below.

The "emulsification-graining" step must be carried out with the use of between 0.75 and 1.50 parts of water for each part of trinitrotoluene. The use of a greater proportion of water prevents the formation of the emulsion and the use of a lower proportion has the same effect, as well as causing severe mechanical difficulties.

As an illustration of how we may subject our "emulsification-grained" trinitrotoluene to the sodium sulfite treatment, we give the following example:

The "emulsification-grained" trinitrotoluene, produced as described above, and still contained in the stirring tank, is cooled to about 45–50° C. and most of the free water then drained out. To this mixture a 12% solution of $Na_2SO_3$ in water is added until a sodium sulfite ($Na_2SO_3$) concentration of about 3% is obtained. The contents of the tank is stirred for about one hour, then discharged into a filter, washed with cold water and dried.

We wish to emphasize that this sulfite-treatment step is old and that we may use many modifications of this step, all of which are old. However, when this step is combined with the "emulsification graining" step or with the "emulsification graining" and "tri-nitration" steps, new and useful results are obtained, the principal one being a rise in the setting point of the trinitrotoluene of as much as 4° C. as compared with the usual rise of 1.8 to 2.2° C. This is a very significant improvement over the known art.

It should be noted that the examples mentioned above are given for purposes of illustration and clarity and are not intended to limit us to the specific operating conditions mentioned therein. It will be readily apparent to persons skilled in this art that the proportions of the various ingredients of the nitrating mixture may be varied considerably and that a few simple trials with various mixed acids will show what proportions and concentrations of the ingredients are best for any desired nitration, the essential requirements of the nitration step being that the spent acid formed in the nitration be of a composition within the limits mentioned above and that its quantity be insufficient to dissolve all the trinitrotoluene which forms during the nitration.

We therefore do not limit ourselves in any way except as indicated in the appended claim.

We claim:

In the process for the purification of trinitrotoluene the step which comprises rapidly stirring a hot mixture of an impure trinitrotoluene containing asymmetric trinitrotoluene and water, said mixture of trinitrotoluene and water being at a temperature of not less than 80° C. and consisting of one part of trinitrotoluene to from 0.75 to 1.50 parts by weight of water, then slowly cooling said mixture, under continued stirring, to below the solidification temperature of the trinitrotoluene in the mixture.

JOSEPH A. WYLER.
RICHARD N. BOYD.